(12) United States Patent
Charmat

(10) Patent No.: US 7,270,220 B1
(45) Date of Patent: Sep. 18, 2007

(54) THERMO CLIP IN AN ADJUSTOR MECHANISM FOR A DRUM BRAKE

(75) Inventor: Djamel Charmat, South Bend, IN (US)

(73) Assignee: Robert Bosch, GmbH, Stuttgart (DE)

( * ) Notice: Subject to any disclaimer, the term of this patent is extended or adjusted under 35 U.S.C. 154(b) by 224 days.

(21) Appl. No.: 11/163,334

(22) Filed: Oct. 14, 2005

(51) Int. Cl.
*F16D 51/00* (2006.01)

(52) U.S. Cl. .................. 188/79.52; 188/79.56

(58) Field of Classification Search ............. 188/327, 188/79.51, 79.52, 79.53, 79.56, 79.61
See application file for complete search history.

(56) References Cited

U.S. PATENT DOCUMENTS

| | | | |
|---|---|---|---|
| 4,220,227 A | | 9/1980 | Kluger |
| 4,385,681 A | * | 5/1983 | Conrad et al. ........... 188/79.52 |
| 4,390,086 A | | 6/1983 | Conrad |
| 4,502,574 A | | 3/1985 | Spaargaren |
| 4,706,783 A | * | 11/1987 | Rath et al. ............... 188/79.52 |
| 4,706,784 A | * | 11/1987 | Shellhause ............... 188/79.52 |
| 4,938,320 A | * | 7/1990 | Hyde et al. .............. 188/79.52 |
| 5,246,090 A | * | 9/1993 | Quere et al. ............. 188/79.52 |
| 6,196,360 B1 | * | 3/2001 | Iizuka et al. ............. 188/79.52 |
| 6,328,141 B1 | * | 12/2001 | Asai et al. ............... 188/79.52 |
| 6,345,702 B1 | * | 2/2002 | Tessitore ................. 188/79.52 |
| 6,397,984 B1 | * | 6/2002 | De Andreis et al. ..... 188/79.52 |
| 6,684,986 B1 | | 2/2004 | Bogucki |
| 6,691,838 B2 | * | 2/2004 | Wang ...................... 188/79.51 |
| 6,918,468 B2 | * | 7/2005 | Girini et al. ............. 188/79.52 |
| 7,178,642 B1 | * | 2/2007 | Chamat ................... 188/79.52 |

* cited by examiner

*Primary Examiner*—Devon Kramer
(74) *Attorney, Agent, or Firm*—Leo H. McCormick, Jr.; Sarah Taylor

(57) ABSTRACT

An adjuster arrangement for maintaining first and second brake shoes of a brake between a minimum and a maximum clearance with respect to a drum. The adjuster arrangement has a pawl located on a pivot pin on the first brake shoe and an arm that engages a star wheel of an expandable strut. A first leg of a thermo clip is held against the first brake shoe by the pivot pin and receives thermal energy generated during a brake application. During a brake application, the pawl pivots on the pin and imparts a rotary torque to the star wheel to expand the strut to create a maximum clearance while at the same time a predetermined temperature generated during a brake application acts on the thermo clip to moves the pawl out of engagement with the star wheel to prevent rotating the star wheel and thereby sustain a minimum clearance.

11 Claims, 2 Drawing Sheets

THERMO CLIP IN AN ADJUSTOR MECHANISM FOR A DRUM BRAKE

This invention relates to a thermo clip that acts on a pawl of an adjustment mechanism in a drum brake to limit an increment of adjustment when a temperature generated during a brake application exceeds a predetermined value to assure a minimum running clearance is present after a brake application.

BACKGROUND OF THE INVENTION

U.S. Pat. Nos. 4,220,227 and 4,502,574 disclose adjuster mechanisms for use in a drum brake to control the extension of a strut member and define a running clearance between a friction surface on brake shoes and a drum member. In particular, the adjuster mechanism includes a pawl carried by a first brake shoe wherein a spring is connected to the pawl and the other brake shoe such that movement of the first brake shoe toward the drum causes the pawl to pivot on the first brake shoe. When a predetermined movement of the brake shoe occurs as when lining wear occurs, the pawl pivots to an extent that a first edge moves past a tooth on a star wheel and when the brake application terminates, the first edge again engages the tooth and rotates the star wheel to cause an extension in the strut member. This type adjuster mechanism functions in an adequate manner for most operations, however, should the drum brake be operated under extreme conditions such as when the thermal energy generated during a brake application caused the drum to expand and now when an input force is applied to moves the friction surface on the brake shoe into engagement with the drum it is possible that the first edge on the pawl will move past several teeth on the star wheel. Now on return of the pawl to a rest position, a second edge engages the star wheel and rotates the star wheel through an arc corresponding to several teeth such that a desired running clearance is largely reduced or non-existent. Thereafter when the drum cools, it contracts and if the running clearance is totally eliminated, the brake will drag until the friction lining is worn away through continued engagement with the drum. Thus, it is important to control the rotation of the star wheel so that the extendable strut is not over adjusted and the brake shoes are maintained with a desired running clearance with respect to the drum.

In order to prevent such over adjustment caused by thermal expansion, a bimetallic member has been placed in the expandable strut as disclosed in U.S. Pat. No. 4,390,086 and on an end member to engage the pawl as disclosed in U.S. Pat. No. 6,691,838 and a leg of the pawl as disclosed in U.S. Pat. No. 4,385,681 to move the pawl out of engagement with the star wheel when a predetermined temperature is generated during a brake application. While brakes having such bimetallic members function in an adequate manner it has been observed that under some conditions, over adjustment may still occur as the thermal energy generated during a brake application is not directly conducted into the bimetallic strip but passes though several members and as a result a delay occurs in the disengagement of the pawl and the star wheel.

SUMMARY OF THE INVENTION

A primary object of the present invention is to provide a v-shaped thermo clip that is held against a web of a brake shoe that directly receives thermal energy generated during a brake application to provide a force that moves a pawl out of engagement with a star wheel of an adjuster arrangement when a predetermined temperature is reached during a brake application.

This invention is used with a brake having a first web with friction lining attached thereto and a second web with friction lining attached thereto that engage a friction surface on a drum to effect a brake application. Each engagement of the friction linings with the friction surface of the drum generate thermal energy and as a result the drum may experience some expansion that requires an actuator member to correspondingly move an additional distance during a brake application. During each brake application, some friction lining is worn away and in order to maintain a desired running clearance between the friction lining and the friction surface on the drum, an extendable strut is located between the first web and the second web. The extendable strut includes a first member that is connected to the first web and separated from a second member connected to the second web by an adjuster mechanism that includes a star wheel with a first shaft located in a first bore in the first member and a second shaft with threads thereon that are mated with a threaded bore of the second member and the pawl. A first leg of the pawl is connected by a spring to the second web and a second leg is connected to the star wheel such that during a brake application the pawl pivots and when such pivoting exceeds a predetermined amount the second leg rotates past a tooth on the star wheel and when the brake application is terminated the spring acts on the first leg such that the second leg engages the tooth to move the threaded shaft out of the threaded bore and incrementally extend the extendable shaft such that a maximum running clearance is maintained. In the present invention, a first leg of the v-shaped thermo clip is held against the first web by the pivot pin while a second leg engages the pawl such that thermal energy generated during braking is directly conducted into the first leg of the v-shaped thermo clip. As the temperature of the thermo clip increases the second leg responds by expanding and after overcoming a component force of the spring acts on, moves and holds the pawl away from the star wheel when a predetermined temperature develops during a brake application. When the brake application terminates, the spring moves the pawl to a position of rest however, the second leg does not engage the tooth of the star wheel and thus the thermal expansion of the drum is not a factor in the expansion of the strut and a running clearance that was present prior to the brake application is sustained for a subsequent brake application.

An advantage of this invention resides in locating a thermo clip directly on a web of a brake shoe such that an immediate response to a predetermined temperature resulting from the generation of thermal energy moves a pawl out of engagement with a star wheel of an expandable strut to essentially eliminate any effect of thermal expansion on an adjustment of the length of the strut.

DETAILED DESCRIPTION

Figure 1:
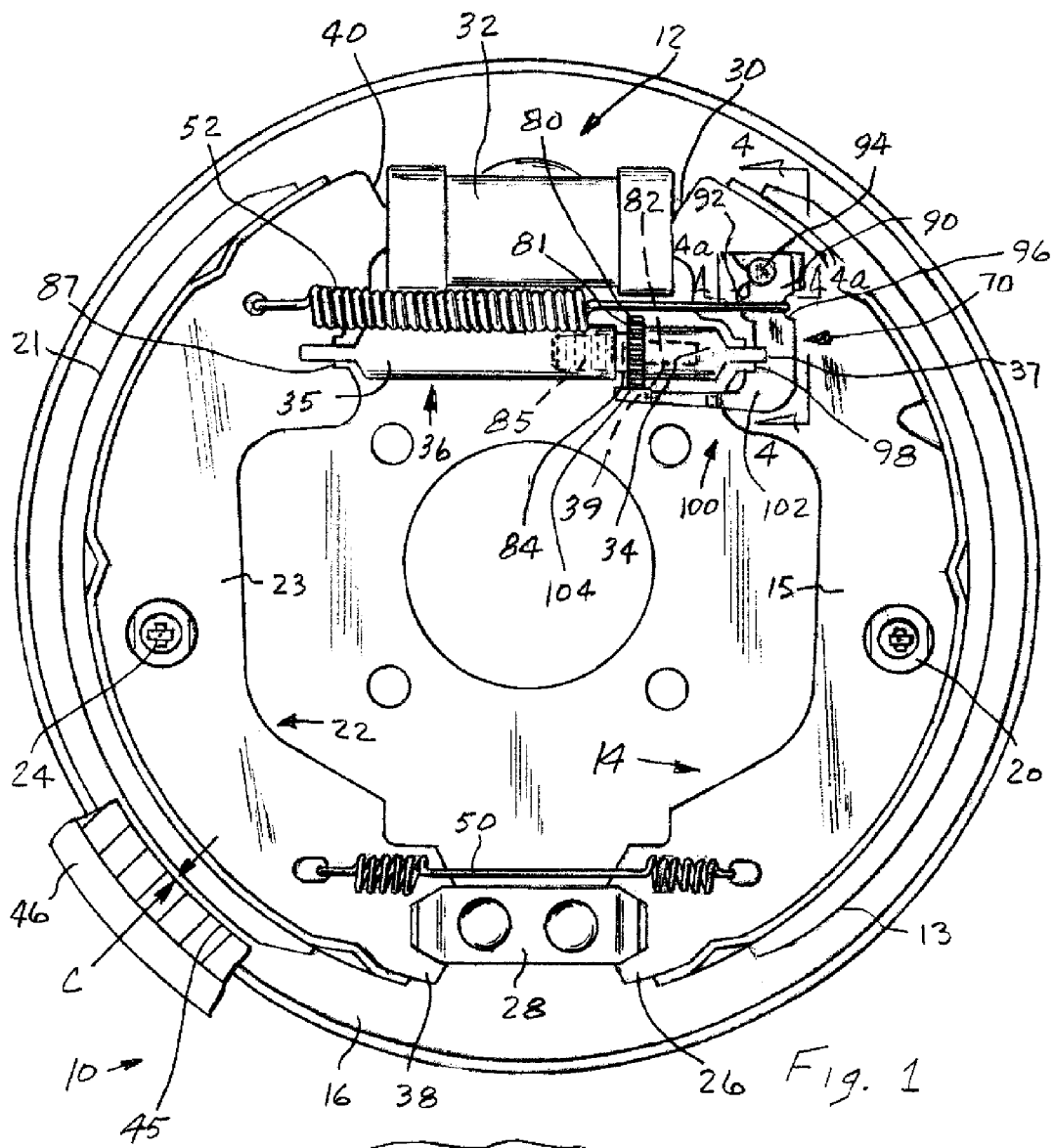
FIG. 1 is a schematic illustration of a drum brake for a vehicle having a v-shaped thermo clip, according to the present invention, retained on a web by a pivot pin for a pawl and connected to a star wheel of an adjuster arrangement.

The drum brake 10 shown in FIG. 1 for use in a vehicle includes an actuator assembly 12 for effecting a brake application. The drum brake 10 is of a general type as disclosed in U.S. Pat. No. 4,502,574 wherein a first brake shoe 14 is mounted on the backing plate 16 by a first spring clip and pin 20 and a second brake shoe 22 is mounted on the backing plate 16 by a second spring clip and pin 24. The first brake shoe 14 has a web 15 with a first engagement end 26 located in a guide slot on a projection of an anchor 28 on the backing plate 16 and a second engagement end 30 that is connected to wheel cylinder 32 included in the actuator assembly 12 and a notch that receives a first body or section 34 of an extendable strut 36. The second brake shoe 22 has a web 23 with a first engagement end 38 located in a guide slot on projection of the anchor 28 and a second engagement end 40 that is connected to wheel cylinder 32 and receives a second body or section 35 of the extendable strut 36. A first spring 50 attached to webs 15 and 23 urges the first engagement ends 26, 38 toward anchor 28 while a second spring 52 is attached to pawl 70 of an adjuster mechanism 100 and web 23 urges the second engagement ends 30, 40 toward the wheel cylinder 32 such that the first 14 and second 22 brake shoes are positioned with respect to drum 46 to define a running clearance "C" when the actuator assembly 12 is in a position of rest. The running clearance "C" for the first 14 and second 22 brake shoes is determined by the length of the extendable strut 36 that is located between webs 15 and 23.

The extendable strut 36 is defined by a star wheel 80 that is located between a first body 34 and a second body 35. The first body 34 is essentially a cylinder having a first end 37 with a slot for receiving web 15 of brake shoe 12 and a second end defined by a smooth a bore or socket 39 therein for receiving a corresponding smooth shaft 82 of the star wheel 80. The star wheel 80 in addition to smooth shaft 82 has a threaded shaft or stem 84 that is mated with a threaded bore 86 in the second body 35. The second body 35 is essentially a cylinder with a slot 87 for receiving web 23 of brake shoe 22. The star wheel 80 has a plurality of teeth 81,81' . . . 81n having a uniform pitch wherein each tooth represents an equal arcuate segment or increment that establishes a limit for modifying the running clearance "C" during a single brake application.

The pawl 70 along with the extendable strut 36 is part of the adjuster mechanism 100 and is defined a base or first leg 90 having a first slot 92 for receiving a pivot pin 94 that is fixed to web 15 for located the base 90 on web 15 to permit pivotal movement of the pawl 70, an opening or groove 96 for receiving a first end of spring 52 that is connected to web 23, a second slot 98 for receiving the first end 37 of the first body 34 of the extendable strut 36 and an second leg or arm 102 that extends from the base or first leg 90 to align a blade 104 thereon in perpendicular alignment with a first tooth 81 of the plurality of teeth on the star wheel 80. A thermo clip 200 as best shown in FIGS. 2 and 3 that is made of a bimetallic material is located on the pivot pin 94 between the pawl 70 and web 15 to control the engagement of the blade 104 with the teeth 81,81' . . . 81n on star wheel 80 as a function of the temperature experienced by or present in web 15.

Figure 2:
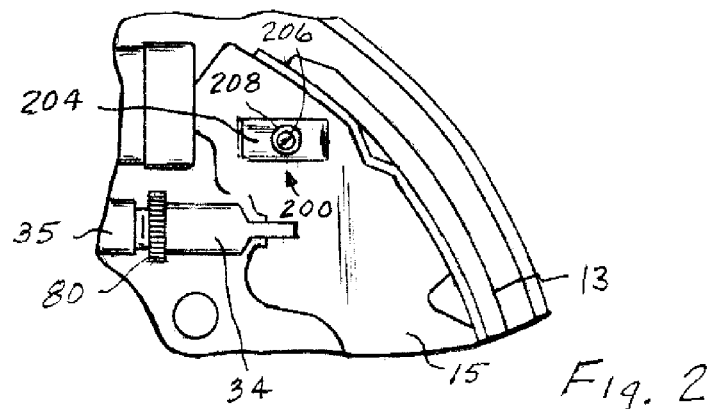
FIG. 2 is a perspective view of the thermo clip for use in the brake of FIG. 1.
Figure 3:
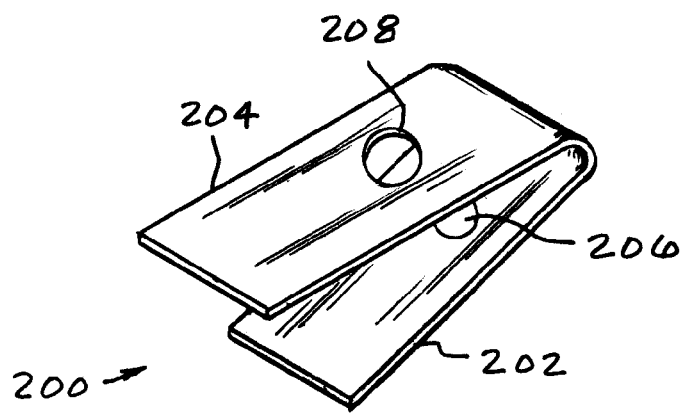
FIG. 3 is a view of the drum brake of FIG. 1 showing the attachment of the thermo clip to a web of a brake shoe.
Figure 4:
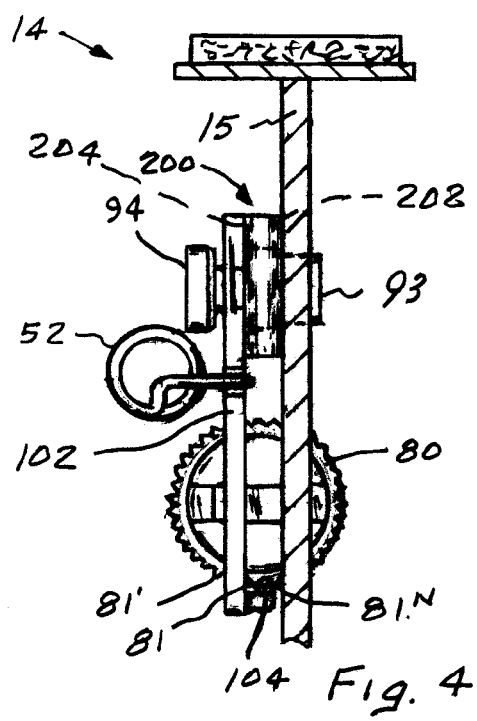
FIG. 4 is a sectional view taken along lines 4-4 of FIG. 1
Figure 4A:
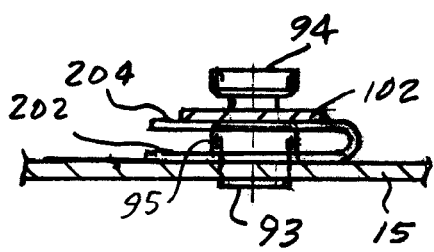
FIG. 4a is a sectional view taken along lines 4a-4a showing a relationship the pivot pin, v-shaped thermo clip, web, pawl and star wheel when the temperature experienced in the drum brake is below a predetermined level.

In more detail, the thermo clip 200 as illustrated in FIG. 2 has a v-shape defined by a first leg 202 hinged to a second leg 204. The first leg 202 has a first opening 206 therein while the second leg 204 has a second opening 208 therein with the first opening 206 having a smaller diameter than the second opening 208 such that a shoulder 95 on pivot pin 94 passes through the second opening 208 and engages the first leg 202 as the end 93 on pivot pin 94 passes through the first opening 206 to hold the first leg 202 tight against the first web 15 as shown in FIGS. 4 and 4a. Spring 52 provides an axial force that urges the first leg 90 of pawl 70 into engagement with the second leg 204 of the thermo clip 200 that is retained on web 15 by pivot pin 94 such that the temperature as present in the web 15 is directed into the thermo clip 200.

With the actuator mechanism 100 in a rest position and the temperature experienced by brake 10 is below a predetermined level, the pawl 70 and star wheel 80 have a relationship as illustrated in FIGS. 1 and 4 wherein blade 104 on leg 102 of pawl 70 engages a first tooth 81 and the legs 202 and 204 of the thermo clip 200 are essentially parallel. Spring 52 acts on the first leg 90 of pawl 70 to bias the extendable strut 36 into engagement with webs 15 and 23 and the second engagement ends 30 and 40 into engagement with wheel cylinder 32 to define the running clearance "C".

The length of the extendable strut 36 may be altered by rotating star wheel 80 on the first body 34 with respect to this second body 35 to establish and maintain a predetermined running clearance "C" between a first friction surface 13 on brake shoe 14, a second friction surface 21 on brake shoe 22 and friction surface 45 on drum 46. The first brake shoe 14 is urged toward the second brake shoe 22 by the action of the first spring 50 urging the ends 26, 38 toward the anchor post 28 and the second spring 52 urging the second ends 30, 40 toward wheel cylinder 32 with the length of the extendable strut 36 located between and webs 15 and 23 limiting the movement of the second ends 30, 40 toward the wheel cylinder 32.

Mode of Operation

A hydraulic input force from actuator assembly is supplied to wheel cylinder 32 and acts on the second engagement ends 30 and 40 of webs 15 and 23 of the first 14 and second 22 brake shoes. After overcoming the force of springs 50 and 52, the input force moves the first 14 and second 22 brake shoes through the running clearance "C" to bring friction surfaces 13 and 21 into engagement with the friction surface on drum 46 to effect a brake application. As web 15 moves from the position of rest, the first leg 90 of pawl 70 pivots on pin 94 such that blade 104 slides toward the apex of a first tooth 81. If the distance that the web 15 moves exceed a predetermined distance, the first leg 90 pivots sufficiently such that the first blade 104 moves past the apex of tooth 81 and toward a second tooth 81'. When the hydraulic input supplied to the wheel cylinder 32 terminates, the input force applied to the second engagement ends 30, 40 also terminates and springs 50 and 52 return the first 14 and second 22 brake shoes to a rest position as illustrated in FIG. 1. As web 15 returns to the position of rest, spring 52 acts on the first leg 90 of the adjustment mechanism 100 to rotate pawl 70 to a position of rest such that the first blade 104 now engages tooth 81 and rotates the star wheel 80 to a position where tooth 81' is perpendicular to the blade 104 rather than tooth 81. The rotation of the star wheel 80 is defined an increment of the pitch of tooth 81 and as a result adjustment of the extendable strut 36 in establishing a running clearance "C" resulting from an hydraulic input force supplied to wheel cylinder 32 is limited during a brake application.

During a brake application, thermal energy is generated through the engagement of friction surfaces 13 and 21 with the friction surface 45 on drum 46. The thermal energy is directly carried into web 15 and with the first leg 206 of the thermo clip 200 is tight against the web 15 by shoulder 95 on pivot pin 94, the same temperature present in the web 15 is also present in the thermo clip 200.

Figure 5:
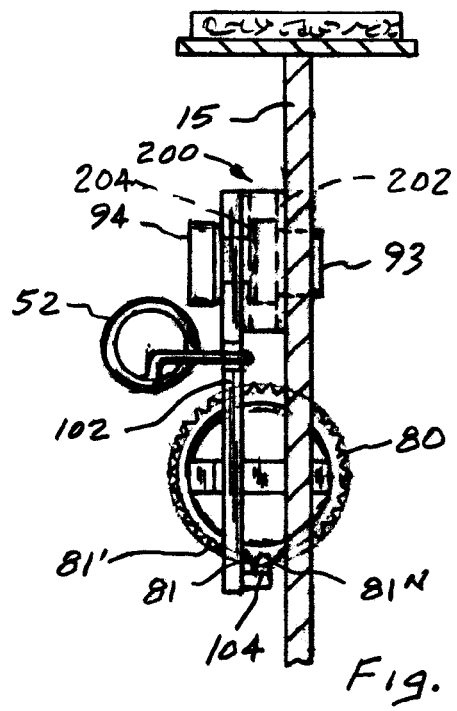
FIG. 5 is a sectional view taken along lines 4-4 of FIG. 1
Figure 5A:
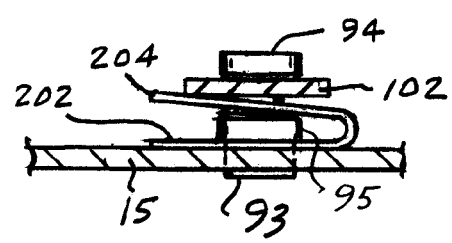
FIG. 5a is a sectional view taken along 4a-4a showing a relationship the pivot pin, v-shaped bimetallic clip, web, pawl and star wheel when the temperature experienced in the drum brake is above a predetermined level.

The thermo clip 200 being a bimetallic member responds to temperature change such that the second leg 208 pivots about the hinge to develop an axial force that acts on the first leg 90 of pawl 70 and after overcoming the axial component of the spring force 52 moves the first leg or base 90 and correspondingly the second leg or arm 102 away from the web 15 as illustrated in FIGS. 5 and 5a. When the second leg 208 has moves about 15 degree with respect to web as a result of a temperature of about 200 degree Fahrenheit being generated during a brake application, the second leg 208 will have moved sufficiently that blade 104 is moved out of contact with tooth 81 on the star wheel 80 as illustrated in FIG. 5 and an thermal expansion of the drum 46 that could effect the pivoting motion of pawl 74 is rendered in effective. On termination of the actuation force, the return spring 52 acts to return the first brake shoe and second brake shoe to a position of rest but the blade 104 does not engage tooth 81 and a minimum running clearance present before the brake application remains between the friction surfaces 13 and 21 and the friction surface 45 on drum 46.

What is claimed is:

1. In a brake having a first web with friction lining attached thereto and a second web with friction lining attached thereto that engage a friction surface on a drum to effect a brake application while at the same time creating thermal energy, an extendable strut having a first member connected to the first web that is separated from a second member connected to the second web by an adjuster mechanism for maintaining a running clearance between the friction linings and the friction surface, said adjuster mechanism having a star wheel with a first shaft located in a first bore in the first member and a second shaft with threads thereon that are mated with a threaded bore of a second member and a pawl with a first leg connected by a spring to said second web and a second leg connected to the star wheel such that with movement of said first and second webs during the brake application, the pawl pivots and when the running clearance exceeds a predetermined distance rotates the star wheel to correspondingly move the threaded shaft out of the threaded bore and incrementally extend the extendable shaft such that a maximum running clearance is maintained, a bimetallic member for disconnecting the second leg of the pawl from the star wheel when the thermal energy generated during a brake application exceeds a predetermined temperature and thereby prevent the pivoting of the pawl from rotating the star wheel as a result of thermal expansion of the drum; said brake being characterized by said pawl being located on a pin that is fixed to the first web; and by said bimetallic member being defined by a v-shaped clip having a first leg that is held against the first web by said pin and a second leg that engages said first leg of the pawl, said first web receiving thermal energy during a brake application that is directly conducted into said first leg of the clip such that the second leg immediately responds by expanding and after overcoming a component force of said spring acts on the first leg to move the second leg of the pawl away from the star wheel when the predetermined temperature develops during a brake application to assure a minimum running clearance is present after a brake application.

2. In the brake as recited in claim 1 wherein the first leg of the v-shaped clip is characterized by a first opening and the second leg is characterized by a second opening, said first opening having a smaller diameter than said second opening such that a shoulder on said pin passes through said second opening and engages said first leg as the pin passes there through to hold the first leg against the first web.

3. In the brake as recited in claim 2 wherein said first second leg of said v-shaped clip is in parallel alignment with said first leg of said pawl.

4. In the brake as recited in claim 1 wherein said v-shaped clip is characterized by a first opening in said first leg and a second opening in the second leg, said pin having a shoulder that passes through said second opening and engaging said first leg as the pin passes through the first opening and is fixed to the first web to hold the first leg against the first web.

5. In the brake as recited in claim 4 wherein said spring acts on said pawl to define an axial force that urges the pawl toward said second leg of said v-shaped clip and first web to align the second leg of said pawl with the star wheel.

6. In the brake as recited in claim 5 wherein said predetermined temperature of below 200 degrees Fahrenheit.

7. In the brake as recited in claim 6 wherein said predetermined temperature moves the second leg through an angle of about 15 degree in moving the second end of the pawl off of the star wheel.

8. In the brake as recited in claim 7 wherein said second opening in said second leg allow said second leg to freely move with respect to said pin.

9. In the brake as recited in claim 8 wherein said spring acts through said pawl to urge said first and second webs into contact with said actuator.

10. An adjuster arrangement for a drum brake of a vehicle including an extendable strut that is located between a first web of a first brake shoe and a second web of a second shoe to define a running clearance between the first and second shoes and a drum, said first and second brake shoes being retained on a backing plate that is secured to the vehicle such that a first engagement end on the first web and said second web are aligned with an anchor on the backing plate and a second engagement end thereon are spaced apart by an actuator member, a first spring that is attached to the first and second webs urges the first engagement ends toward the anchor while a second spring is attached to a pawl of the adjuster mechanism and to the second web to urge the first web and the second web toward an extendable strut of said adjuster mechanism and an actuator member such that the first and second brake shoes are positioned with respect to the drum to define a maximum running clearance when said actuator member is in a rest position, said actuator member responding to an input force by acting on said first and second webs and after overcoming the opposition of the first and second springs move the first and second brake shoes through the running clearance and into engagement with said drum to effect a brake application, said extendable strut including a shaft with a star wheel located between a first threaded section and a smooth section with the smooth section that is retained in a bore of a first cylindrical body of the extendable strut that is connected to the first web while the first threaded section is mated with a second threaded section in a second cylindrical body that is connected to the second web, said pawl pivoting on movement of the first and second webs by the actuator member to rotate said star wheel when a predetermined pivotal movement occurs to correspondingly rotate said first threaded section with respect to said second threaded section causing said extendable strut to expand and re-define a desired running clearance; and a bimetallic member connected to said pawl to disconnect the pawl from the star wheel when thermal energy generated during a brake application exceeds a predetermined temperature to thereafter prevent rotation of the star wheel caused by thermal expansion of the drum, said brake being characterized by said pawl being located on the first web by a pin on which the pawl pivots and wherein said bimetallic member is a v-shaped clip having a first leg that is held against the first web by said pin and a second leg that engages the first leg of said pawl, said first web receiving thermal energy during a brake application that is directly conducted into said first leg of said clip such that the second leg correspondingly pivots about said first leg and to move the second leg on the pawl away from the star wheel when the predetermined temperature developed during a brake application is reached.

11. In a brake having a first web with a first friction lining attached thereto and a second web with a second friction lining attached thereto that engage a friction surface on a drum to effect a brake application and create thermal energy, an extendable strut located between the first web and the second web with an adjuster mechanism for maintaining a desired maximum running clearance between the friction linings and the friction surface, said extendable strut having a first member connected to the first web, a star wheel having first shaft located in a first bore of a first member and a second shaft with first threads thereon that are mated with second threads of a second member connected to the second web, a pawl with a first leg connected by a spring to the second web and a second leg connected to the star wheel such that movement of said first and second webs cause the pawl to pivot and when the movement of the first and second webs exceeds a predetermined distance the pawl rotates the star wheel and correspondingly rotates the first threads with respect to the second threads to move the second shaft out of the second member to incremental extend the extendable shaft such that a maximum running clearance is maintained, a bimetallic member connected to said pawl to disconnect the second leg of the pawl from star wheel when thermal energy generated during a brake application exceeds a predetermined temperature to prevent rotation of the star wheel caused by thermal expansion of the drum, said brake being characterized by said pawl being located on the first web by a pin on which the pawl pivots and wherein said bimetallic member is a v-shaped clip having a first leg that is held against the first web by said pin and a second leg that engages the first leg of said pawl, said first web receiving thermal energy during a brake application that is directly conducted into said first leg of said clip such that the second leg correspondingly pivots about said first leg and to move the second leg on the pawl away from the star wheel when the predetermined temperature develops during a brake application.

* * * * *